United States Patent
Raichelgauz et al.

(10) Patent No.: US 12,217,511 B1
(45) Date of Patent: *Feb. 4, 2025

(54) REAL TIME MANAGEMENT OF DETECTED ISSUES

(71) Applicant: AUTOBRAINS TECHNOLOGIES LTD, Tel Aviv-Jaffa (IL)

(72) Inventors: Igal Raichelgauz, Tel Aviv (IL); Idan Geller, Tel Aviv-Jaffa (IL); Lior Eldar, Tel Aviv-Jaffa (IL)

(73) Assignee: AUTOBRAINS TECHNOLOGIES LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,260

(22) Filed: Jun. 10, 2024

(51) Int. Cl.
*G06V 20/56* (2022.01)
*B60W 60/00* (2020.01)
*G06V 10/764* (2022.01)
*G06V 10/82* (2022.01)

(52) U.S. Cl.
CPC ........... *G06V 20/56* (2022.01); *B60W 60/001* (2020.02); *G06V 10/764* (2022.01); *G06V 10/82* (2022.01)

(58) Field of Classification Search
None
See application file for complete search history.

(56) References Cited

U.S. PATENT DOCUMENTS

| | | | | |
|---|---|---|---|---|
| 2019/0155678 | A1* | 5/2019 | Hsiong | G06F 11/0793 |
| 2022/0382279 | A1* | 12/2022 | Wray | G05D 1/0088 |
| 2024/0203131 | A1* | 6/2024 | Rahimi | G06V 10/776 |

* cited by examiner

*Primary Examiner* — Rebecca A Volentine
(74) *Attorney, Agent, or Firm* — RECHES PATENTS (57) ABSTRACT

A method for real time management of detected issues, the method includes producing, by a classification unit having a neural network, a classification decision for sensed information obtained in an environment of a vehicle; generating, by one or more computing devices with auto-labeling capabilities, an automated ground truth labeling for the sensed information; detecting, by the one or more computing devices and based on a performance indication related to the automated ground truth labeling, an issue with respect to the classification decision; and responsive to the detecting, addressing the detected issue in a driving in the environment of the vehicle by a computer device associated with the vehicle, using a signature generated in association with at least the classification decision or with the detected issue. The neural network is in a same state in the producing of the classification decision, the detecting the issue, and the addressing the detected issue.

28 Claims, 9 Drawing Sheets

REAL TIME MANAGEMENT OF DETECTED ISSUES

BACKGROUND

Neural networks are employed in vehicles for various purposes including the classification of items sensed by sensors related to the vehicle.

Neural networks, even when extensively trained, may output erroneous classification decisions.

The erroneous classification decisions may be retrained or otherwise amended in order to correct the erroneous classification decisions. The retraining is time consuming, require extensive and costly software updates by a vehicle manufacturer.

There is a growing need to provide a more efficient way of solving erroneous classification decisions.

SUMMARY

A method, a system and a non-transitory computer readable medium as illustrated in the application.

A BRIEF DESCRIPTION OF THE DRAWINGS

The embodiments of the disclosure will be understood and appreciated more fully from the following detailed description, taken in conjunction with the drawings in which.

DETAILED DESCRIPTION

The different figures illustrates examples of units and/or software and/or information items and/or steps and/or components. These examples are provided for brevity of explanation. At least one of the units and/or software and/or information items and/or steps and/or components is optional or mandatory.

There is provided a method, a system and a computer readable medium for automatically and systematically finding and correcting neural network erroneous classification decision-without retraining the neural network-thereby maintaining the state of the neural network unchanged. The state of the neural network is the weights associated to the neurons of the network and the connectivity between the neurons.

Figure 1:
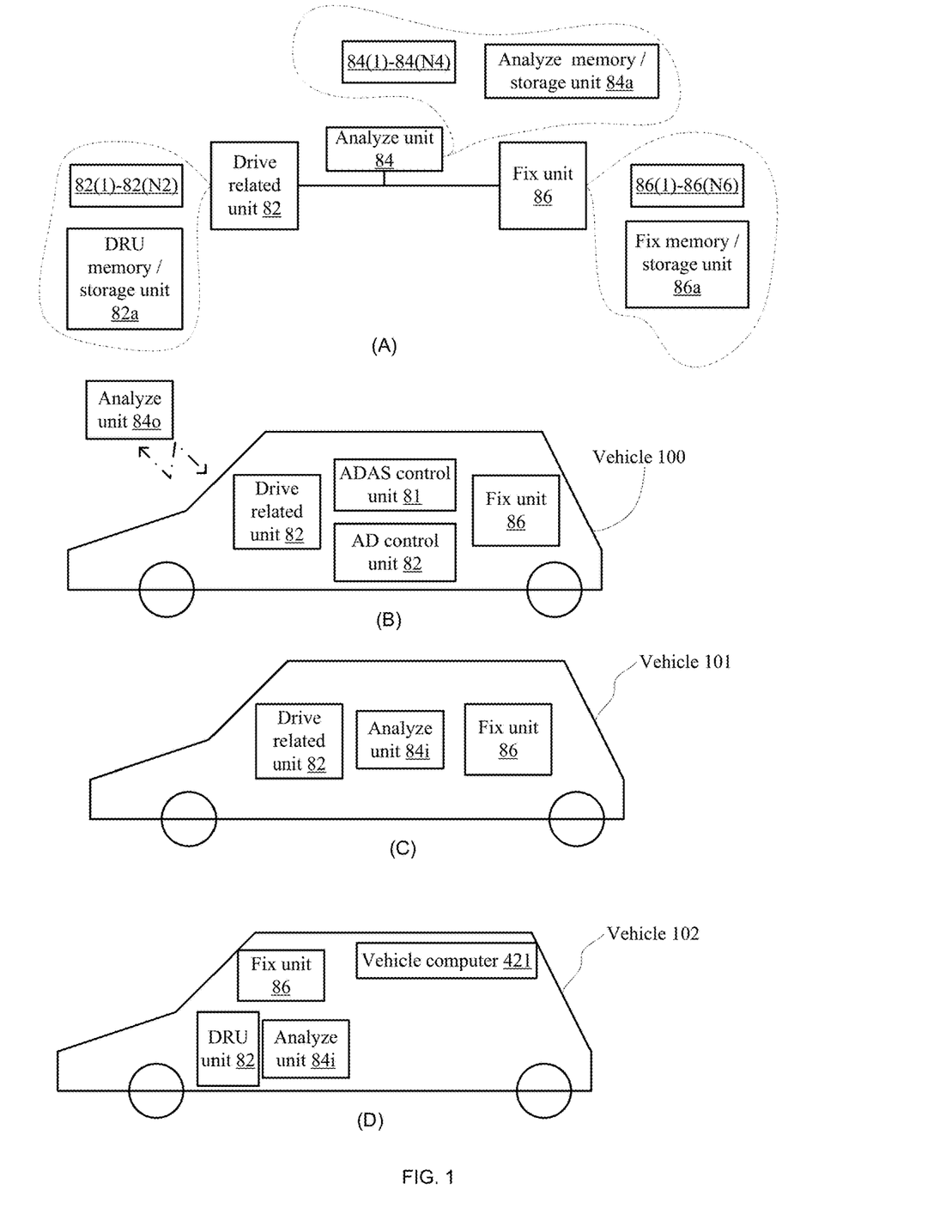
FIG. 1 illustrates examples of vehicles and units.

FIG. 1 (part A) illustrates an example of a drive related unit 82, an analyze unit 84 and a fix unit 86 that communicate in each other in order to solve issues related to classification decisions generated by a neural network of the drive related unit 82.

The drive related unit (DRU) 82 includes a first number (N2) of processing circuits 82(1)-82 (N2) and a DRU memory/storage unit 82a configured to store software (or any other forms of instructions and/or code) and/or information and/or metadata required for performing drive related functions such as object detection, scene detection, classification, and the like.

The analyze unit 84 has auto-labeling capabilities and includes a second number (N4) of processing circuits 84(1)-84 (N4) and a analyze memory/storage unit 85a configured to store software (or any other forms of instructions and/or code) and/or information and/or metadata required for performing analysis.

The fix unit 86 is configured to fix various issues without changing the state of the neural network and includes a third number (N6) of processing circuits 86(1)-86 (N6) and a fix memory/storage unit 86a configured to store software (or any other forms of instructions and/or code) and/or information and/or metadata required for fixing issues.

FIG. 1 (part B) illustrates that analyze unit 840 is located outside the vehicle 100—but in communication with the vehicle. Vehicle 101 includes DRU 82 and fix unit 86. The vehicle may also include advanced driver assistance system (ADAS) control unit 81 and autonomous driving (AD) control unit 82.

FIG. 1 (part C) illustrates that analyze unit 84i is located within the vehicle 101—along with DRU 82 and fix unit 86.

According to an embodiment, the analyze unit 84 of FIG. 1 (part B) is configured to a allocate much more (for example by a factor of two till ten or even more) computational and memory resources for analyzing a sensed information unit—in comparison to the drive related unit. This allows the analyze unit to be more reliable than the drive related unit.

The analyze unit may include many more processing circuits and/or much stronger processing circuits than the drive unit for tasks such as classification. Additionally or alternatively, the analyze unit may allocate more time (for example seconds, days, minutes, hours and even days) for processing a sensed information unit-thereby operating not in real time—or at least not at the acquisition rate of information sensed unit.

According to an embodiment, an in-vehicle analyze unit may include fewer resources than the out of vehicle analyze unit—and/or may (instead of processing every received sensed information unit) process only selected sensed information units and/or perform a simpler processing that those executed by the out of vehicle analyze unit. According to an embodiment the analyze unit (especially the in vehicle analyze unit) may be configured to select which sensed information unit to process—and/or how to process the sensed information unit (for example select the processing out of different options that exhibit different tradeoffs between accuracy and/or latency associated) based on one or more factors such as the relative velocity between the vehicle and other road users or the road itself, the danger associated with the environment of the vehicle, and the like.

FIG. 1 (part D) illustrates a vehicle 102 that includes drive related unit 82, analyze unit 84, fix unit 86, and vehicle computer 421.

The ADAS control unit 81 is configured to control ADAS operations.

The autonomous driving control unit 82 is configured to control autonomous driving of the autonomous vehicle.

The vehicle computer 421 is configured to control the operation of the vehicle-especially controlling the engine, the transmission, and any other vehicle system or component.

Figure 2:
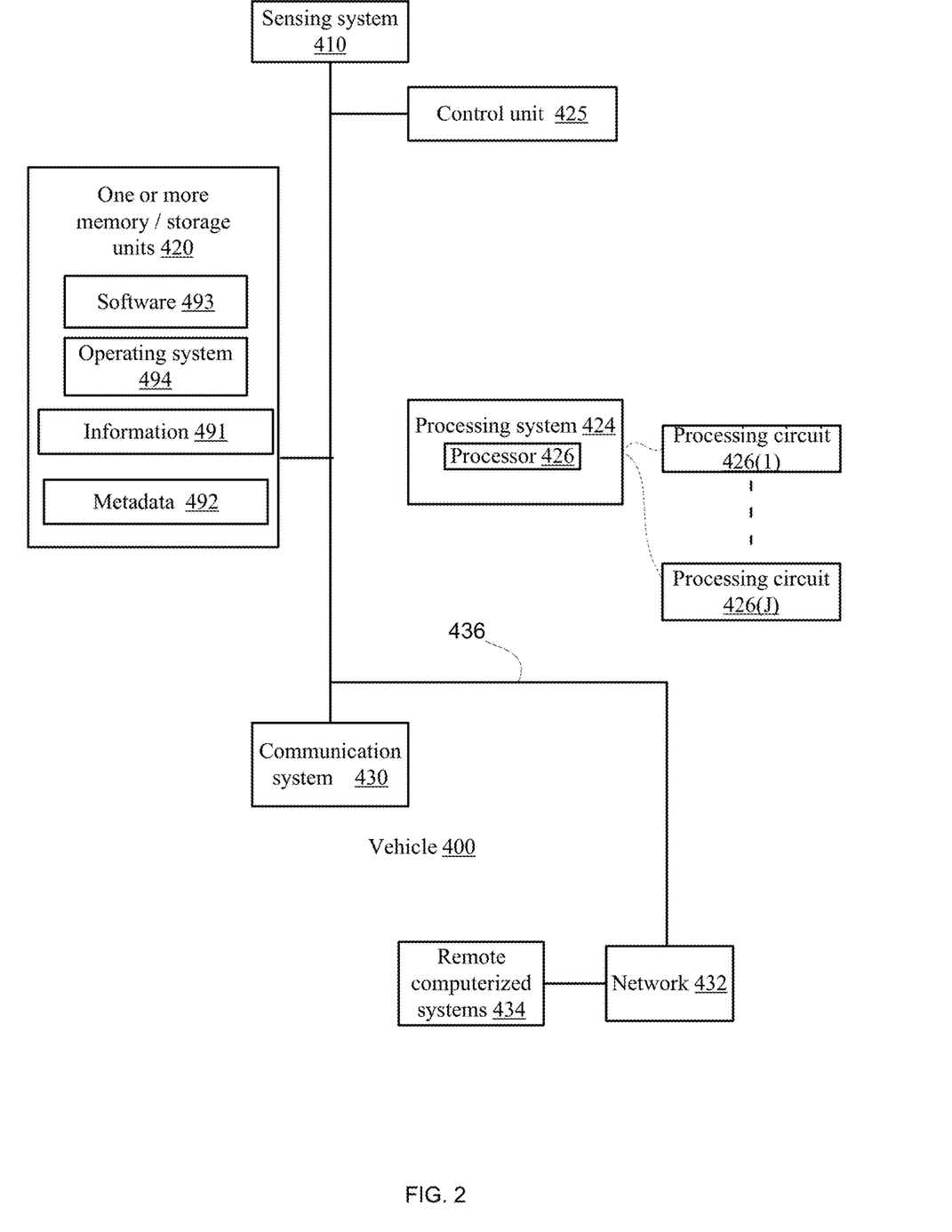
FIG. 2 illustrates an example of a system.

The vehicle computer 421 may be in communication with an engine control module, a transmission control module, a powertrain control module, and the like FIG. 2 illustrates an example of a computerized system 400 that includes communication system 430, one or more memory and/or storage units 420, processing system 424 including processor 426. The computerized system may be a server, a laptop, a desktop or any other computer and may include or be in communication with a sensing unit and/or a controller.

According to an embodiment, computerized system 400 is in communication with network 432 and one or more other remote computerized systems 434 that are in communication with network 432. An example of a remote computerized system is illustrated in FIG. 1 (part B) in which the analyze unit is external to the vehicle.

According to an embodiment, the communication system 430 is configured to enable communication between the one or more memory and/or storage units 420 and/or the sensing system 410 and/or any one of the additional units and/or the network 432 (that is in communication with the remote computerized systems).

The memory and/or storage units 420 was shown as storing software. Any reference to software should be applied mutatis mutandis to code and/or firmware and/or instructions and/or commands, and the like.

Processor 426 includes a plurality of processing units 426(1)-426(J), J is an integer that exceeds one. Any reference to one unit or item should be applied mutatis mutandis to multiple units or items. For example—any reference to processor should be applied mutatis mutandis to multiple processors, any reference to communication system 430 should be applied mutatis mutandis to multiple communication systems.

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any content may be stored in any part or any type of the memory and/or storage units.

According to an embodiment, the at least one memory unit stores at least one database-such as any database known in the art-such as DB2®, Microsoft® Access, Microsoft® SQL Server, Oracle®, mySQL, PostgreSQL, and the like.

The memory and/or storage units 420 are configured to store firmware and/or software, one or more operating systems, data and metadata required to the execution of any of the methods mentioned in this application.

The memory and/or storage units 420 was shown as storing software. Any reference to software should be applied mutatis mutandis to code and/or firmware and/or instructions and/or commands, and the like.

Various units and/or components are in communication with each other using any communication elements and/or protocols. An example of a communication system is denoted 430. Other communication elements may be provided.

The communication system 430 may be in communication with bus 436. The bus represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus, and all buses specified in this description can also be implemented over a wired or wireless network connection and each of the subsystems.

Network 432 that is located outside the vehicle and is used for communication between the vehicle and at least one remote computing system. By way of example, a remote computing system can be a personal computer, a laptop computer, portable computer, a server, a router, a network computer, a peer device or other common network node, and so on. Logical connections between the processor and either one of remote computing systems can be made via a local area network (LAN) and a general wide area network (WAN). Such network connections can be through a network adapter (may belong to communication system 430) which can be implemented in both wired and wireless environments. Such networking environments are conventional and commonplace in offices, enterprise-wide computer networks, intranets, and a larger network such as the internet.

It should be noted that at least a part of the content illustrated as being stored in one or more memory/storage units 420 may be stored outside the vehicle. It should also be noted that the processor may evaluate signatures generated by a plurality of detectors.

Examples of generating signatures and/or cropping images are provided in U.S. patent application Ser. No. 18/527,701 which is incorporated herein by reference.

According to an embodiment, the memory and/or storage units 220 stores at least one of: operating system 494, information 491, metadata 492, and software 493.

Using the software, the processing system is configured to execute one or more methods of method 100, 200, 500, or 600.

Vehicle 400 also includes sensing system 410 and control unit 425.

The control unit 425 may cooperate with an advanced driver assistance system (ADAS) control unit, an autonomous driving control unit 422 and/or may control or communicate with other vehicle components-including a vehicle computer.

The sensing system 410 may include optics, a sensing element group, a readout circuit, and an image signal processor. Optics are followed by a sensing element group such as line of sensing elements or an array of sensing elements that form the sensing element group. The sensing element group is followed by a readout circuit that reads detection signals generated by the sensing element group. An image signal processor is configured to perform an initial processing of the detection signals—for example by improving the quality of the detection information, performing noise reduction, and the like. The sensing system 410 is configured to output one or more sensed information units (SIUs).

The control unit 425 is configured to control the operation of the sensing system 410, and/or the one or more memory and/or storage units 420 and/or the one or more additional units (except the controller).

According to an embodiment, the one or more memory and/or storage units 420 includes one or more memory unit, each memory unit may include one or more memory banks.

According to an embodiment, the one or more memory and/or storage units 420 includes a volatile memory and/or a non-volatile memory. The one or more memory and/or storage units 420 may be a random-access memory (RAM) and/or a read only memory (ROM).

According to an embodiment, the non-volatile memory unit is a mass storage device, which can provide non-volatile storage of computer code, computer readable instructions, data structures, program modules, and other data for the processor or any other unit of vehicle. For example, and not meant to be limiting, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information, and which can be accessed by a computer.

Any content may be stored in any part or any type of the memory and/or storage units.

According to an embodiment, the at least one memory unit stores at least one database-such as any database known in the art-such as DB2®, Microsoft® Access, Microsoft® SQL Server, Oracle®, mySQL, PostgreSQL, and the like.

Various units and/or components are in communication with each other using any communication elements and/or protocols. An example of a communication system is denoted 430. Other communication elements may be provided.

Figure 3:
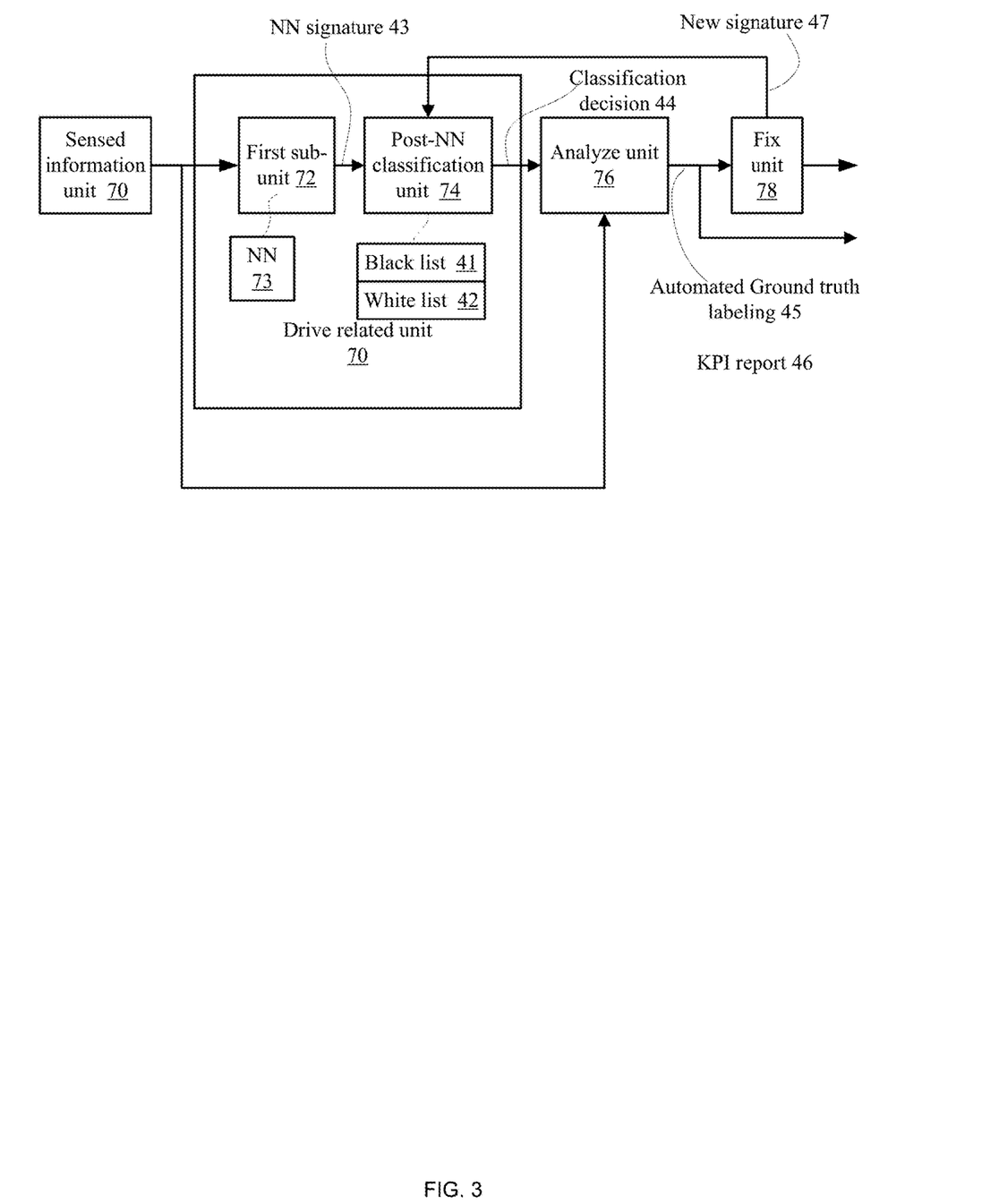
FIG. 3 illustrates an example of units.

FIG. 3 illustrates an example of a drive related unit 74, an analyze unit 76, and a fix unit 78 in communication with each other.

The drive related unit 74 is configured to receive a sensed information unit 70 that may be unlabeled or only partially labeled (for example up to 10, 20, 30, 40 percent of the items in the sensed information unit are labeled), to feed the sensed information unit 70 to a first sub-unit 72 that includes a neuron network (NN) 73. The NN generates a NN signature 43 that may be erroneous. Then NN signature is fed to a post-NN classification unit 74 that is configured to generate a classification decision 44—based, for example, on comparing the NN signature 74 tor reference clusters associated with defined road elements such as objects related to the environment of a vehicle of scenes related to the environment.

The classification decision 44 and the sensed information unit are fed to an analyze unit 76 having auto-labeling capabilities. The analyze unit 76 is configured to output an automated ground truth labeling 45 which is indicative of one or more road elements captured by the sensed information unit. According to an embodiment, the analyze unit 76 is also configured to generate a KPI report 46. According to an embodiment, the analyze unit 76 is also configured to detect based on a performance indication related to the automated ground truth labeling, an issue with respect to the classification decision. According to an embodiment the detection of the issue is made by another unit and not by the analyze unit 76.

According to an embodiment, and responsive to the detecting, the fix unit 78 is requested to address the detected issue, using a signature generated in association with at least the classification decision or with the detected issue. The signature may be the NN signature 43 or maybe a new signature 49 generated by the fixe unit 78. For example— while the NN 73 is not retrained—the NN signature associated with the issue may be flagged as faulty—for example may be added to a blacklist 41 of erroneous signatures. The post-NN classification unit 74, when receiving the faulty NN signature will find that that NN signature belongs to the blacklist 41 and will not send a classification decision based on that erroneous NN signature. According to an embodiment, the new signature 49 is added to the whitelist 42 off correct signatures—and may be even linked to the erroneous NN signature so that once the post-NN classification unit 74 received the erroneous NN signature—the classification decision will be based on the new signature 49—for example the new signature may be compared to the reference clusters.

Figure 4:
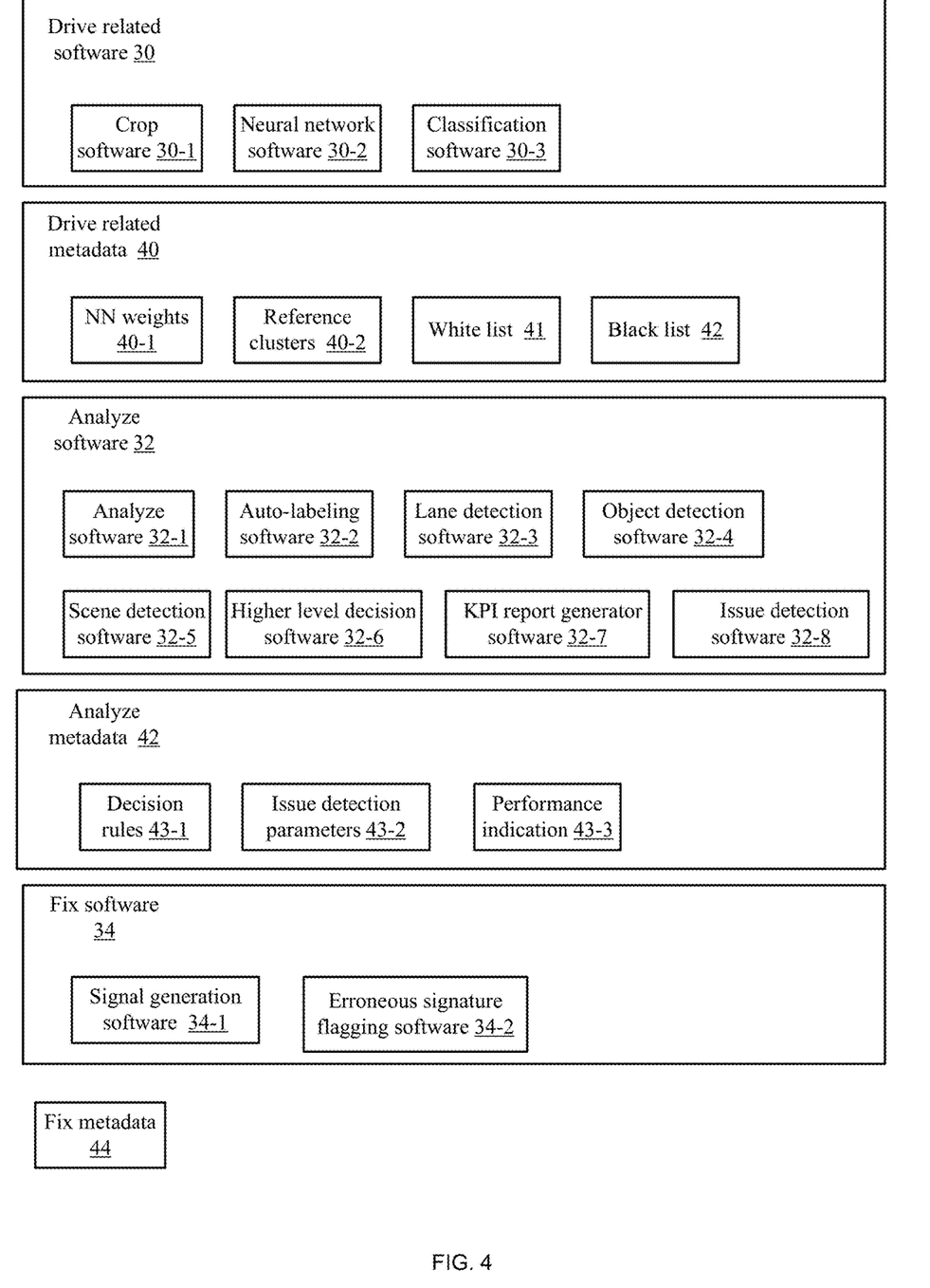
FIG. 4 illustrates an example of software and metadata.

FIG. 4 illustrates examples of metadata and/or software stores in at least one memory/storage units out of DRU memory/storage unit 82*a*, analyze memory/storage unit 84*a*, and fix memory/storage unit 86*a*.

The examples include drive related software 30 and drive related metadata 40 for facilitating the operation of the DRU (72, 82), analyze software 32 and analyze metadata 42 for facilitating the operation of the analyze unit (74, 84), and fix software 34 and fix metadata 44 for facilitating the operation of the fix unit (76, 86).

Examples of drive software 30 include crop software 30-1 for generating a cropped image, neural network software 30-2 (used for implementing NN 93), classification software 30-3 (used by the post-NN classification unit 74).

Examples of drive metadata 40 include NN weights 40-1, reference clusters 40-2, whitelist 41, blacklist 42.

Examples of analyze software 32 include analyze software 32-1, auto-labeling software 32-2, lane detection software 32-3, object detection software 32-4, scene detection software 32-5, higher level decision software 32-6, KPI report generator software 32-7, and issue detection software 32-8.

Examples of analyze metadata 42 includes decision rules 43-1, issue detection parameters 43-2, and performance indication 43-3.

Examples of fix software 34 include signal generation software 34-1 for generating the new signature, and erroneous signature flagging software 34-2 for flagging the erroneous NN signature as an erroneous signature.

Figure 5:
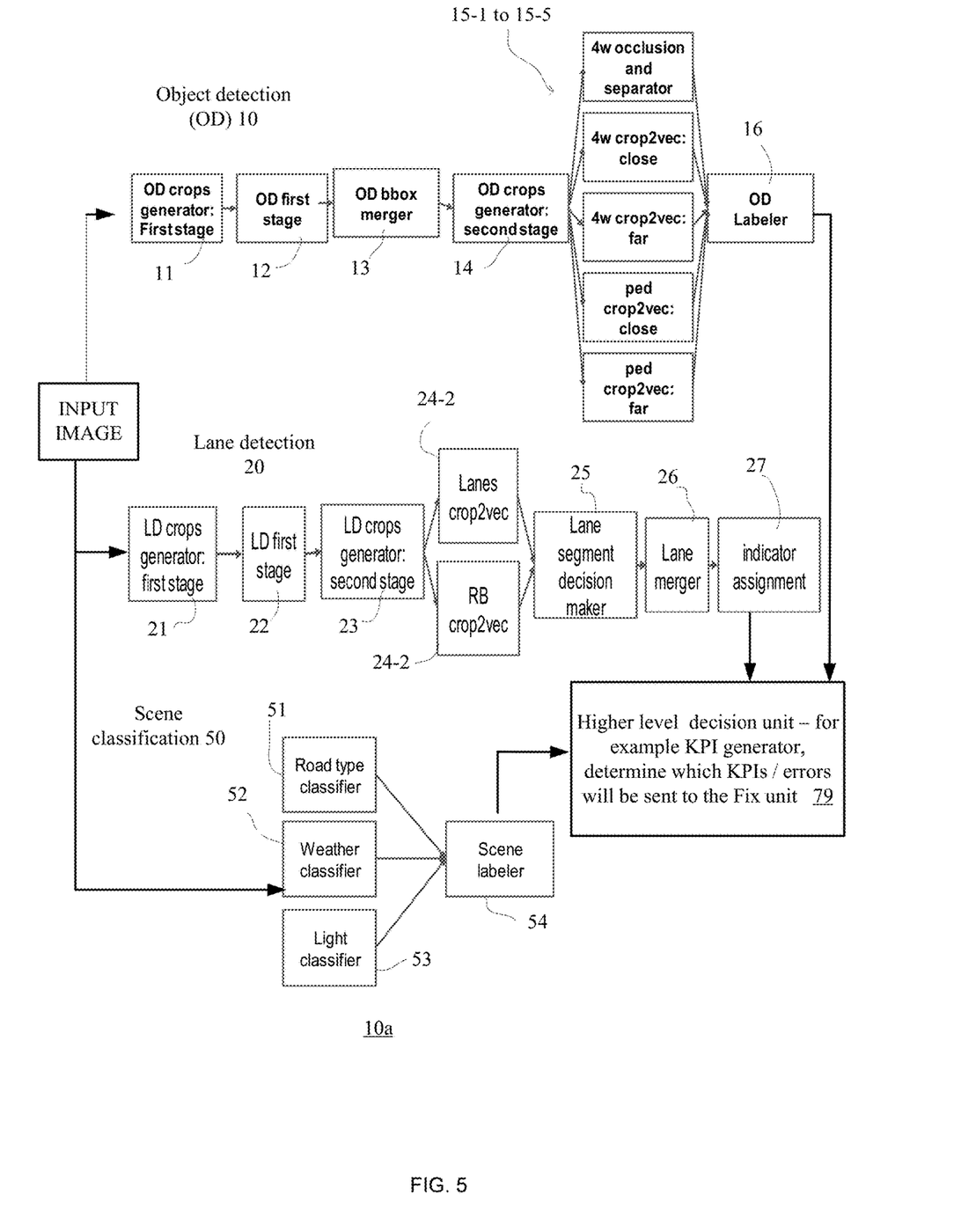
FIG. 5 illustrates an example of an analyze module.

FIG. 5 is an example of analyze unit 10*a*.

Analyze unit 10 includes an object detection portion 10, a lane detection portion 20, a scene classification portion 50 and a higher level decision unit 79—for example KPI generator, determine which KPIs/errors will be sent to the fix unit.

Crop to vector (crop2vec) is configured to generate a cropped image and generate a vector that represents the content of the cropped image. A crop to vector includes one or more neural network and may include a converter to convert neural network featured to a vector such as an embedding or a signature of an embedding. An example of a crop to vector is illustrated in U.S. patent application Ser. No. 18/527,701 which is incorporated herein by reference.

The object detection (OD) portion includes:
- A. OD crops generation 11 configured to takes in a high resolution image and produces smaller crops, one focus and one close-medium ranges, and the other on medium-far ranges. Crops are statically defined, based on density analysis of objects.
- B. First OD stage 12 that is a high computer object detector model such as CoDETR that is configured to run on both crops to produce bounding boxes (bboxes) for objects at all ranges.
- C. CoDETR was introduced in the following article: "DETRs with Collaborative Hybrid Assignments Training", Zhuofan Zong, Guanglu Song and Yu Lin, arXiv: 2211.12860.
- D. OD bonding box (bbox) merger 13 configured to handle overlaps of objects detected in both crops, and marks bboxes to be discarded (bboxes with high overlap between crops, but lower confidence).
- E. OD crops generator-second stage 14 configured to dynamically crops boxes from the image, based on the predicted bboxes from the first stage.
- F. Four wheel (4 W) occlusion and separator 15-1 configured to predicts several useful attributes (3d separator, left side label, right side label, occlusion score), to be used for mapping to 3d position and orientation, as well as how much the object is occluded. It may be configured to run a model (such as but not limited to a DinoV2 model with specialized head), over the crops of the 4-wheel class. Dinov2 was introduced in the following article: "DINOv2: Learning Robust Visual Features without Supervision", Oquab er et., arXiv: 2304.07193.
- G. 4 W crop2vec: close 15-2 configured to run model (such as but not limited to a DinoV2 model with a specialized head and a training procedure) on 4-wheel boxes which are above a certain height (roughly corresponding to close objects), with the purpose of differentiating between 4-wheel subclasses (car\van\truck\bus\train), as well as identifying and flagging false alarms\noisy predictions.
- H. 4 W crop2vec: far 15-3 configured to run model (such as but not limited to a DinoV2 model with specialized head and training procedure) on 4-wheel boxes which are below a certain height (roughly corresponding to far objects), with the purpose of differentiating between 4-wheel subclasses (car\van\truck\bus), as well as identifying and flagging false alarms\noisy predictions.
- I. Pedestrian (Ped) crop2vec: close 15-4 configured to run a model (such as but not limited to a DinoV2 model with specialized head and training procedure) on pedestrian boxes which are above a certain height (roughly corresponding to close objects), with the purpose of differentiating between pedestrian subclasses (pedestrian\rider), as well as identifying and flagging false alarms\noisy predictions.
- J. Ped crop2vec: far 15-6 configured to run model (such as but not limited to a DinoV2 model with specialized head and training procedure) on pedestrian boxes which are below a certain height (roughly corresponding to far objects), with the purpose of differentiating between pedestrian subclasses (pedestrian\rider), as well as identifying and flagging false alarms\noisy predictions.
- K. OD labeler 16 configured to aggregate all predictions of the different models and makes a final decision if a certain bbox should be discarded, ignored during validation, or verified as a real object.

Any number and/or types of modules such as modules 15-1-15-5 may be provided—for example in relation to objects other than pedestrians and vehicles.

The lane detection portion is configured to use a crop2vec to filter lane segments. Lane segment decision maker adds ignore to remaining lanes. Lane merger, only merges lanes not in ignore. The position is configured to perform global lane indicator assignment The lane detection (LD) portion includes:
- A. LD crops generator-first stage 21 configured to receive a high resolution image and produces multiple (for example sixteen) smaller crops, focusing on different parts of the image-different ranges on the road, front vs side lanes, lanes on a curvy road, etc., Crops are statically defined, based on density analysis.
- B. First LD stage 22 which may be a high compute object detector model, such as a CLRerNet, and is configured run on all crops to produce predicted lane segments for both lanes and road boundaries (RB), at all ranges and view angles. CLRerNet was introduced in the following article: "CLRerNet: Improving Confidence of Lane Detection with LaneIoU", Hiroto Honda and Yusuke Uchida, arXiv: 2305.08366.
- C. LD crops generator-second stage 23 is configured to dynamically crops rotated bounding boxes from the image, based on the predicted lanes from the first stage.
- D. Lanes crop2vec 24-1 configured to run a model (such as a DinoV2 model with specialized head and training procedure) on all the rotated boxes encapsulating the predicted lane segments, with the purpose of differentiating between lane types (dashed, continuous, botdots, white, yellow, etc.,), as well as flagging and removing false alarms\noisy predictions.
- E. RB (road boundary) crop2vec 24-2 configured to configured to run a model (such as a DinoV2 model with specialized head and training procedure) on all the rotated boxes encapsulating the predicted road boundary (RB) segments, with the purpose of differentiating between lane types (elevated, flat, barrier, etc.,), as well as flagging and removing false alarms\noisy predictions.
- F. Lane segment decision maker 25 configured to apply a confidence threshold on the remaining lanes and road boundaries. The threshold determines which lane segments should be ignored during evaluation and which should be verified and passed to the lane merger.
- G. Lane merger 27 configured to runs only on the lanes which are not ignored by the decision maker, it applies a graph based clustering algorithm to identify and merge different lane segments belonging to the same overall lane or road boundary line.
- H. Indicator assignment 28 configured to assigns a global line indicator to the lane or RB line w.r.t the position of the vehicle—the ego lanes are marked L0\R0 for left and right lanes at position 0, the adjacent lanes are marked L1\R1 and so on. Road boundaries are similarly marked. This algorithm uses relative positioning and orientation of the lanes w.r.t the viewpoint of the camera, though future versions will use a more robust learning algorithm.

Any number and/or types of modules such as modules 24-1-24-2 may be provided—for example in relation to road elements other than road boundaries and lane.

The scene classification portion 50 includes:
A. Road type classifier 51 configured to classify an image based on detected road type-highway, urban, tunnel, etc.
B. Weather classifier 52 configured to classify an image based on detected weather-clear, cloudy, rain, snow, etc.
C. Light classifier 53 configured to classify an image based on detected lighting conditions-day, night, dawn, dusk, sunset, etc.
D. Scene labeler 54 configured to smooth predictions over time, to ensure there are discontinuities in predictions, and compares to threshold for each class to support flagging images where the classification is not clearly defined. (such as partially cloudy, transitions between urban and highway, etc).

Any number and/or types of scene classifiers may be provided—for example urban or rural environment classifier, and the like.

KPIs may be defined in any manner—by the analyze unit itself, by a user of the vehicle, by a vehicle manufacturer, by any vendor or manufactured of any software of hardware component of any of one of the vehicle, vehicle components, analyze unit components, fix unit components, and the like.

Non-limiting examples of KPI include object detection KPIs, lane detection KPIs, scene classification KPIs, fix related KPIs, detected issues KPIs, classification decision KPIs, signature related KPIs, classification KPIs, neural network related KPIs, and the like.

For example, object detection KPIs may include number of boxes in test set, a score of the boxes that have a score higher than a tested quality metrics, IoU-intersection over union that measured similarity between finite sample tests, true positives TPs (may be determined based on value of IoU), false positives FPs (may be determined based on value of IoU), false negative FNs (may be determined based on value of IoU), precision (for example TP/(TP+FP)), recall (for example TP/(TP+FN)), false positive per images (for example FP/total amount of images).

KPIs may be measured per period of time, per distance traversed by the vehicle, per vehicle speed, per vehicle acceleration, per vehicle state, per duration of a sensed event, per spatial relationship between vehicle and lane (for example—distance to start of lane, distance from one or more lane borders, per angle between vehicle propagation and direction of lane), per spatial relationship between vehicle and road border (for example—distance to start of road border, distance from one or more road borders, per angle between vehicle propagation and direction of road border), per lane parameter (such as lane type-whether crossing a lane border is allowed or forbidden, lane geometry, lane color), per number of images, per number of signatures, per distance range from the vehicle (for example per close range, per medium range or per a far range), per lane, per environment, per weather condition, per illumination condition, per road user type, or any combination of said or any other parameters.

KPI values may be filtered or smoothed or undergo a hysteresis or any other function that prevents too rapid KPI value change. Additionally or alternatively, lane properties are taken into account—for example a width of a straight lane segment is substantially maintained alone the lane segment, lane shape is substantially the same till reaching lane shape changes such as curves, junctions, and the like.

KPIs may be responsive to events such as vehicle movements (for example vehicle events triggered by an incorrect classification), and/or triggers to vehicle movements (for example requesting or instructing the ADAS control unit and/or the AD control unit to perform a vehicle movement), and the like.

Figure 6:
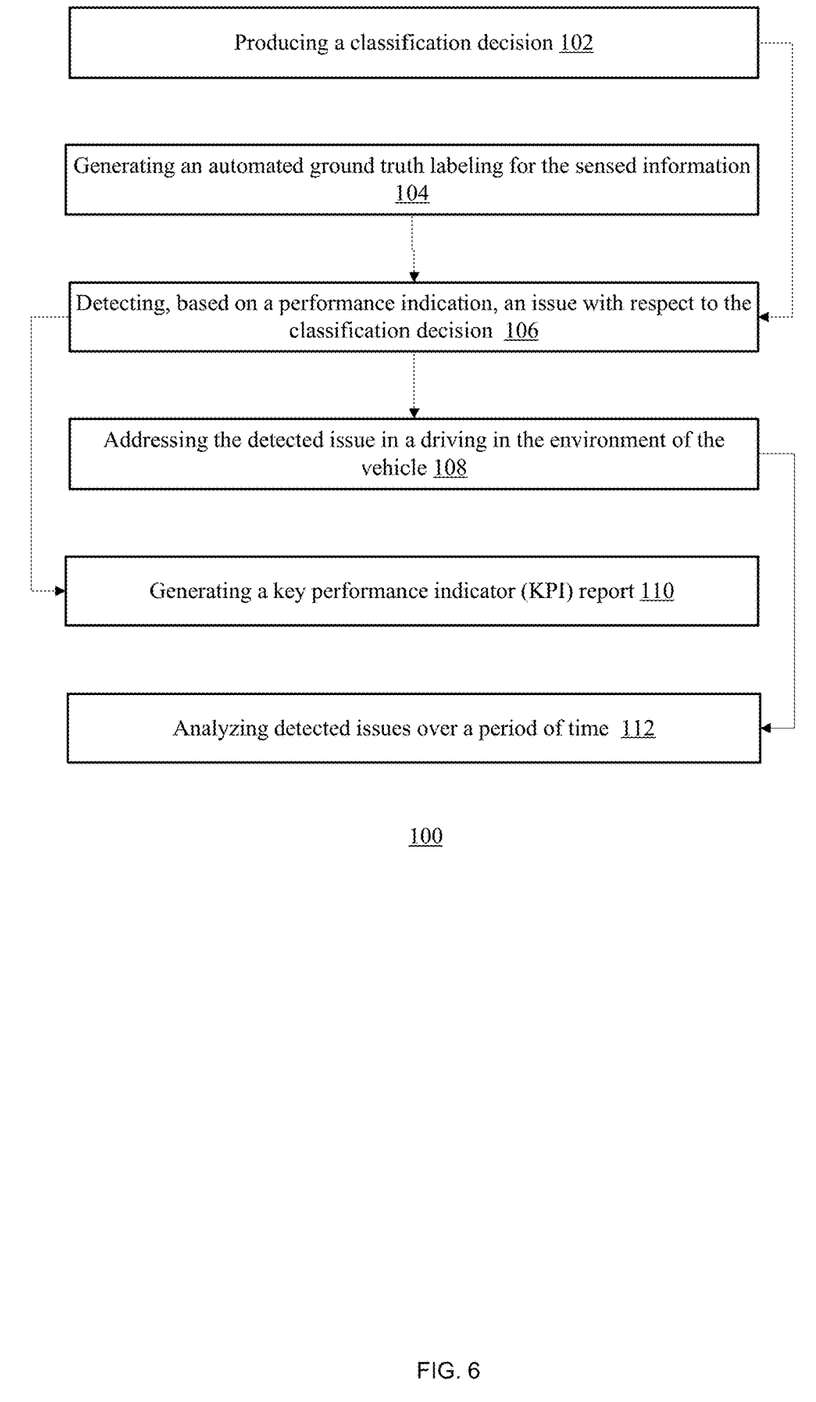
FIG. 6 illustrates an example of a method.

FIG. 6 illustrates an example of method 100 for real time management of detected issues.

According to an embodiment, method 100 includes at least some steps out of steps 102, 104, 106, 108, 100 and 112.

According to an embodiment, step 102 includes producing, by a classification unit having a neural network, a classification decision for sensed information obtained in an environment of a vehicle.

According to an embodiment, step 104 includes generating, by one or more computing devices with auto-labeling capabilities, an automated ground truth labeling for the sensed information.

According to an embodiment, step 106 includes detecting, by the one or more computing devices and based on a performance indication related to the automated ground truth labeling, an issue with respect to the classification decision.

According to an embodiment the issue related to an inaccuracy of the classification decision. The classification decision is compared to the automated ground truth labeling and when is indicative of a class that differs from the class identified in the automated ground truth labeling-then there may be an issue. An issue may be determined based on one or more additional factors such as whether the error impacted the movement of the vehicle.

According to an embodiment, step 108 includes responsive to the detecting, addressing the detected issue in a driving in the environment of the vehicle by a computer device associated with the vehicle, using a signature generated in association with at least the classification decision or with the detected issue.

According to an embodiment, the neural network is in a same state in the producing of the classification decision, the detecting the issue, and the addressing the detected issue.

According to an embodiment, step 108 include verifying that the addressing of the solution places the system in a better position—for example whether the addressing (for example adding a new signature) does not introduce new issues-such as add more errors to the classification process.

According to an embodiment, the signature is generated in association with the classification decision and step 108 includes flagging the signature as being associated with a classification error.

According to an embodiment, step 108 includes determining to ignore the detected issue.

According to an embodiment, step 108 is triggered when the detected issue resulted in an unnecessary movement of the vehicle.

According to an embodiment, method 100 also includes step 110 of generating, by the one or more computing devices, a key performance indicator (KPI) report.

According to an embodiment, method 100 also includes step 112 of analyzing detected issues over a period of time and marking the detected issues for further downstream analysis.

According to an embodiment, the addressing the detected issue involves addressing other detected issues that are classifiably similar (for example—mappable to the same reference cluster) to the detected issue, using the signature. Thus, an object that is similar to an object that triggered a fixing will also benefit from the fixing as it will also be classified correctly following the fixing.

According to an embodiment, the addressing the detected issue involves addressing of other detected issues that are classifiably similar to the detected issue, using the signature.

According to an embodiment, the addressing of the detected issue involves addressing other classification decisions that are classifiably similar to the classification decision, using the signature.

According to an embodiment, the neural network of the classification unit, and another neural network of the one or more computing devices with auto-labeling capabilities are trained with a same training dataset—or with different training datasets.

According to an embodiment, step 108 includes generating the signature for the detected issue using a further neural network that is trained with a same training dataset as the neural network of the classification unit.

Figure 7:
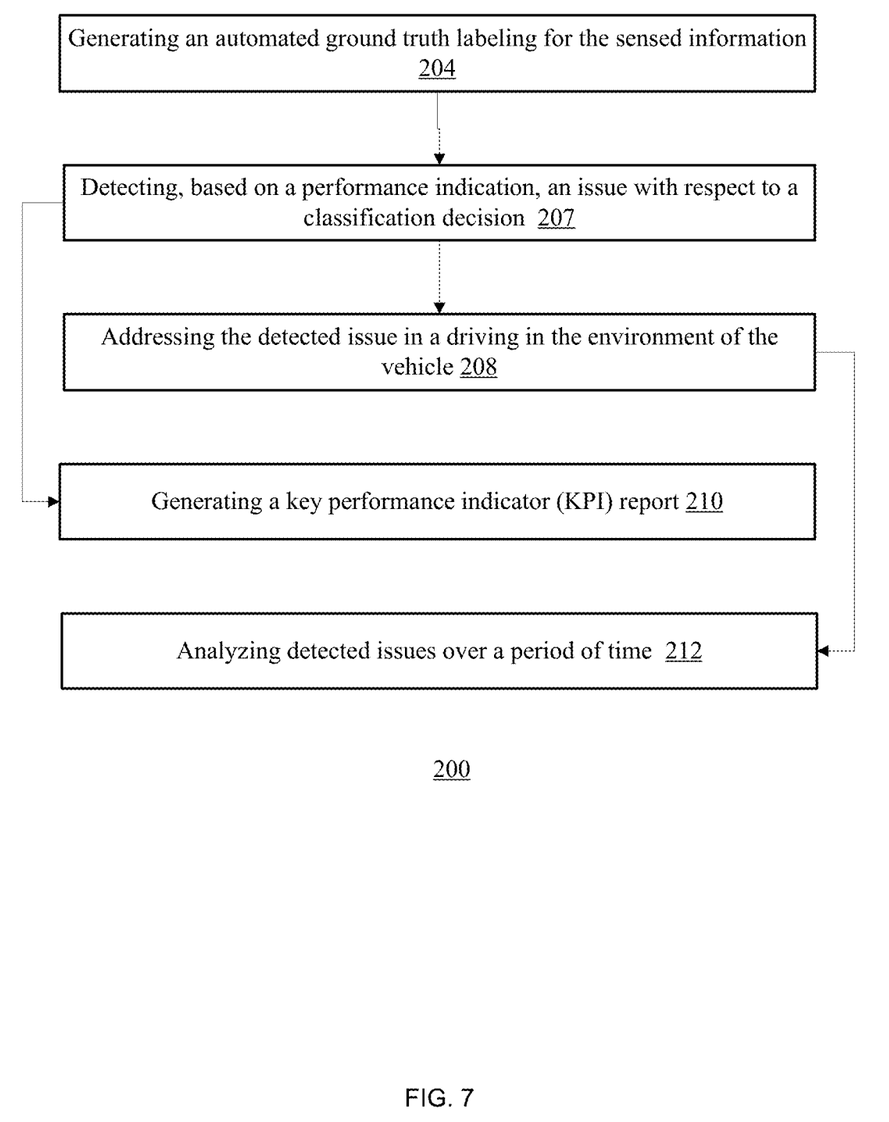
FIG. 7 illustrates an example of a method.

FIG. 7 illustrates an example of method 200 for real time management of detected issues.

According to an embodiment, method 200 includes at least some steps out of steps 204, 207, 208, 200 and 212.

According to an embodiment, step 204 includes generating, by one or more computing devices with auto-labeling capabilities, an automated ground truth labeling for the sensed information.

According to an embodiment, step 207 includes detecting, by the one or more computing devices and based on a performance indication related to the automated ground truth labeling, an issue with respect to a classification detection made for the sensed information using a neural network in a specified state.

According to an embodiment the issue related to an inaccuracy of the classification decision. The classification decision is compared to the automated ground truth labeling and when is indicative of a class that differs from the class identified in the automated ground truth labeling-then there may be an issue. An issue may be determined based on one or more additional factors such as whether the error impacted the movement of the vehicle.

According to an embodiment, step 208 includes responsive to the detecting, addressing the detected issue in a driving in the environment of the vehicle by a computer device associated with the vehicle, using a signature generated in association with at least the classification decision or with the detected issue.

According to an embodiment, the neural network is in a same state in the producing of the classification decision, the detecting the issue, and the addressing the detected issue.

According to an embodiment, the signature is generated in association with the classification decision and step 208 includes flagging the signature as being associated with a classification error.

According to an embodiment, step 208 includes determining to ignore the detected issue.

According to an embodiment, step 208 is triggered when the detected issue resulted in an unnecessary movement of the vehicle.

According to an embodiment, method 200 also includes step 210 of generating, by the one or more computing devices, a key performance indicator (KPI) report.

According to an embodiment, method 200 also includes step 212 of analyzing detected issues over a period of time and marking the detected issues for further downstream analysis.

According to an embodiment, the addressing the detected issue involves addressing other detected issues that are classifiably similar (for example—mappable to the same reference cluster) to the detected issue, using the signature. Thus, an object that is similar to an object that triggered a fixing will also benefit from the fixing as it will also be classified correctly following the fixing.

According to an embodiment, the addressing the detected issue involves addressing of other detected issues that are classifiably similar to the detected issue, using the signature.

According to an embodiment, the addressing of the detected issue involves addressing other classification decisions that are classifiably similar to the classification decision, using the signature.

According to an embodiment, the neural network of the classification unit, and another neural network of the one or more computing devices with auto-labeling capabilities are trained with a same training dataset—or with different training datasets.

According to an embodiment, step 208 includes generating the signature for the detected issue using a further neural network that is trained with a same training dataset as the neural network of the classification unit.

According to an embodiment, a method may be executed at least in part by an in-vehicle analyze unit may include fewer resources than the out of vehicle analyze unit—and/or may (instead of processing every received sensed information unit) process only selected sensed information units and/or perform a simpler processing that those executed by the out of vehicle analyze unit.

According to an embodiment the analyze unit (especially the in vehicle analyze unit) may be configured to select which sensed information unit to process (to provide a determined set of sensed information units)—and/or how to process the sensed information unit based on one or more factors such as but not limited to:

A. The relative velocity between the vehicle and other road users or the road itself (higher relative velocity may require more frequent analysis).
B. The danger associated with the environment of the vehicle (more danger may require more frequent analysis). The danger may be determined in any manner—for example by monitoring the physiological response of one or more persons within the vehicle, by monitoring a current driving pattern of the vehicle and comparing it to driving patterns tagged as dangerous, by calculating a deviation of the current driving pattern from a safe driving policy, by a usage of the brakes and/or by changes in acceleration of deceleration, by calculation a deviation of current acceleration from a steady state acceleration of an average acceleration across a period of time (day, hour, month).
C. The difference between the current speed of the and the allowed speed. Higher difference or a higher percentage of difference may require more frequent analysis.
D. The acquaintance of the driver of the vehicle and the current environment of the vehicle (the acquaintance may be determined based on a number of times the driver has driven through the environment)—as better acquaintance may reduce the frequency of analysis
E. Deviation of a current driving pattern from an average driving pattern of the driver.

F. The relationship between the duration of the analysis and the acquisition rate of the sensed information unit. For example—an acquisition rate of Y sensed information unit per second and an analysis duration of X seconds dictates that an analysis is executed up to once per X*Y sensed information units. X and Y are positive numbers that may range between 0.1 and 100, or 2-50, or any other range.

G. Complexity of the environment—for example a dense urban environment with multiple junctions and/or being usually populated with pedestrians and/or 2 wheel vehicles will require more frequent analysis than a desolate rural highway. The complexity may be based on a density of expected driving related events (events that potentially or an actual impact effect on the driving of the vehicle) and/or on a history of events that occurred in different environments.

According to an embodiment any rule and/or model (including but not limited to a machine learning model) may be applied on any one or any combinations of factors (A)-(G) and/or any other factor to determine at least one of the frequency of the analysis and/or the manner in which the analysis process is applied. According to an embodiment, any mapping between value of any of the factors and the amount in which the frequency of analysis is altered may be provided-a linear mapping, a non-liner mapping, a stepped mapping, and the like. The value of the frequency of analysis may be selected of a group of a defined number (2, 3, 4, 5, 6, 7, 8, or more) frequency values.

According to an embodiment, the manner in which one or more sensed information unit are processed may involve determining the processing out of different processing options that exhibit different accuracies of the processing, and/or different processing options that exhibit different latencies and/or different processing options that exhibit different tradeoffs between accuracy and latency.

According to an embodiment, different processing options differ may from each other by at least one out of resolution, accuracy, size of input information, size of output information, complexity of the analysis process, amount of computational resource required or available for completing the analysis, amount of memory resource required or available for completing the analysis, and the like.

Examples of controlled processing (may be optionally preceded by an initial preprocessing of the sensed information unit(s)):

A. Processing only one or more regions of sensed information units—for example only the center of the sensed information unit. The center may be 5, 10, 15, 20, 25, 30, 35, 40, 45, 50, 55, 60 percent of the sensed information unit.

B. Processing only a limited number (1, 2, 3 and the like) of bounding boxes to be processed.

C. Processing only a limited percentage of objects captured in a sensed information to process (for example up to 1/10, 1/9, 1/8, 1/5, 1/4, 1/3, 1/2, of the objects).

D. Ignoring one or more sensed information units in which the sky and/or far away objects are located.

E. Processing on the one two or three (or any number of most relevant items captured.

F. Applying only a part of the analysis paths—for example, utilizing only one or two, or selected units out of object detection, lane detection and scene classification, etc. Or using only some of the units of the analysis path—for example—utilizing only one or two of modules 15-1-15-5, or only one of modules 24-1 and 24-2.

Figure 8:
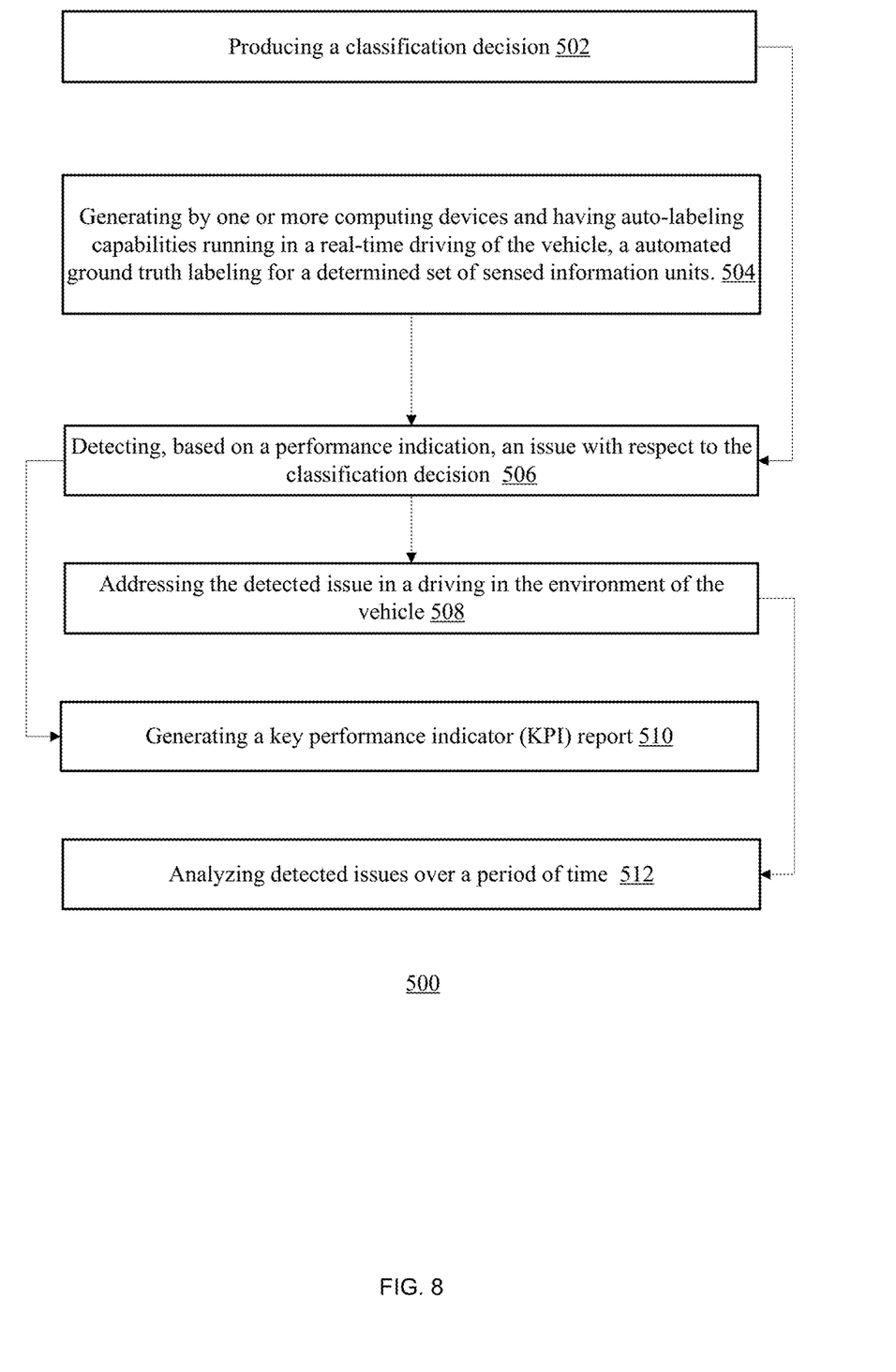
FIG. 8 illustrates an example of a method.

FIG. 8 illustrates an example of method 500 for real time management of detected issues.

According to an embodiment, method 500 includes at least some steps out of steps 502, 505, 506, 508, 500 and 512.

According to an embodiment, step 502 includes producing, by a classification unit having a neural network, a classification decision for sensed information obtained in an environment of a vehicle.

According to an embodiment, step 505 includes generating by one or more computing devices and having auto-labeling capabilities running in a real-time driving of the vehicle, an automated ground truth labeling for a determined set of sensed information units.

According to an embodiment, step 506 includes detecting, by the one or more computing devices and based on a performance indication related to the automated ground truth labeling, an issue with respect to the classification decision.

According to an embodiment the issue related to an inaccuracy of the classification decision. The classification decision is compared to the automated ground truth labeling and when is indicative of a class that differs from the class identified in the automated ground truth labeling-then there may be an issue. An issue may be determined based on one or more additional factors such as whether the error impacted the movement of the vehicle.

According to an embodiment, step 508 includes responsive to the detecting, addressing the detected issue in a driving in the environment of the vehicle by a computer device associated with the vehicle, using a signature generated in association with at least the classification decision or with the detected issue.

According to an embodiment, the neural network is in a same state in the producing of the classification decision, the detecting the issue, and the addressing the detected issue.

According to an embodiment, the signature is generated in association with the classification decision and step 508 includes flagging the signature as being associated with a classification error.

According to an embodiment, step 508 includes determining to ignore the detected issue.

According to an embodiment, step 508 is triggered when the detected issue resulted in an unnecessary movement of the vehicle.

According to an embodiment, method 500 also includes step 510 of generating, by the one or more computing devices, a key performance indicator (KPI) report.

According to an embodiment, method 500 also includes step 512 of analyzing detected issues over a period of time and marking the detected issues for further downstream analysis.

According to an embodiment, the addressing the detected issue involves addressing other detected issues that are classifiably similar (for example—mappable to the same reference cluster) to the detected issue, using the signature. Thus, an object that is similar to an object that triggered a fixing will also benefit from the fixing as it will also be classified correctly following the fixing.

According to an embodiment, the addressing the detected issue involves addressing of other detected issues that are classifiably similar to the detected issue, using the signature.

According to an embodiment, the addressing of the detected issue involves addressing other classification decisions that are classifiably similar to the classification decision, using the signature.

According to an embodiment, the neural network of the classification unit, and another neural network of the one or more computing devices with auto-labeling capabilities are trained with a same training dataset—or with different training datasets.

According to an embodiment, step 508 includes generating the signature for the detected issue using a further neural network that is trained with a same training dataset as the neural network of the classification unit.

Figure 9:
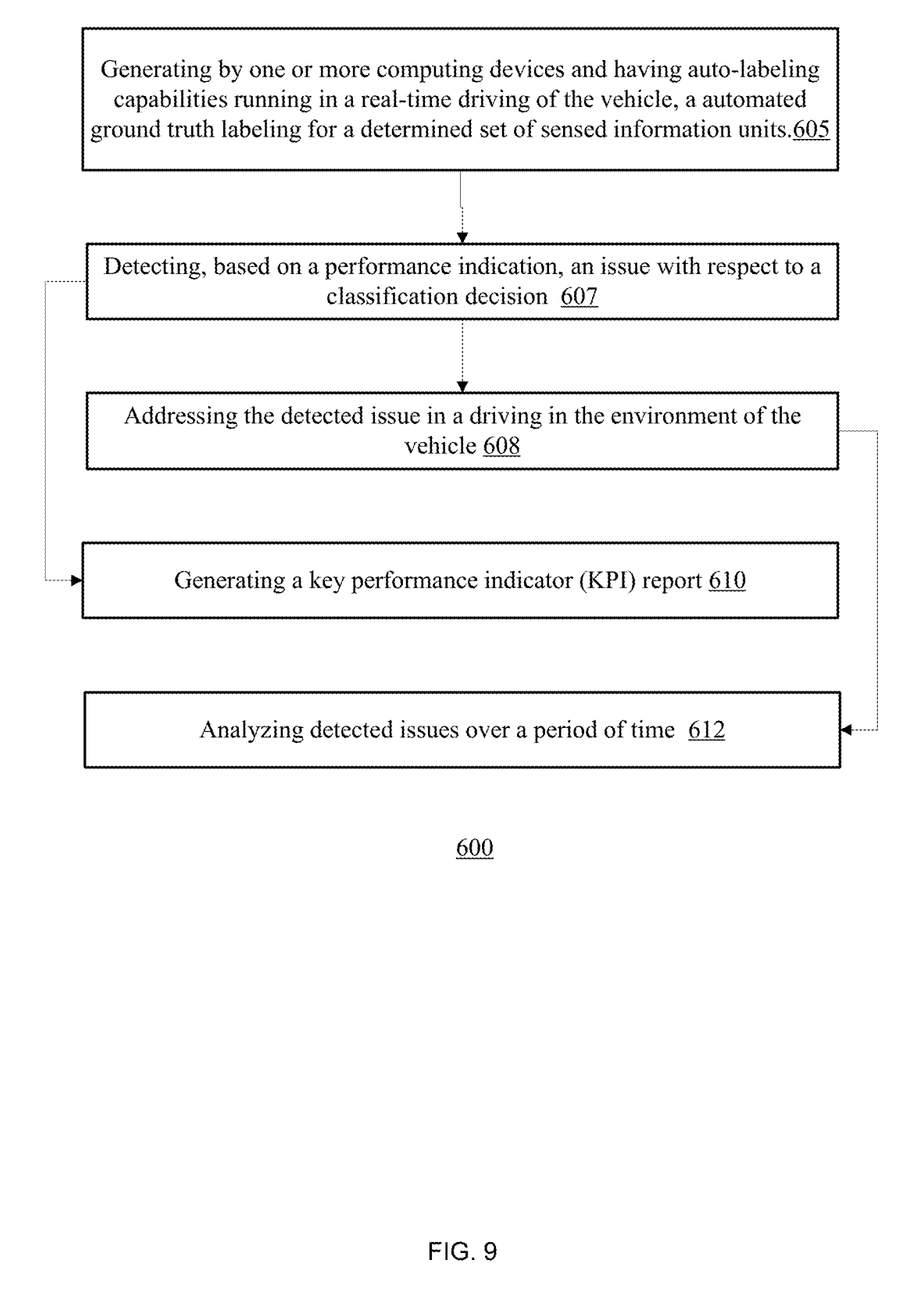
FIG. 9 illustrates an example of a method.

FIG. 9 illustrates an example of method 600 for real time management of detected issues.

According to an embodiment, method 600 includes at least some steps out of steps 605, 607, 606, 608, 600 and 612.

According to an embodiment, step 605 includes generating by one or more computing devices and having auto-labeling capabilities running in a real-time driving of the vehicle, an automated ground truth labeling for a determined set of sensed information units.

According to an embodiment, step 607 includes detecting, by the one or more computing devices and based on a performance indication related to the automated ground truth labeling, an issue with respect to an issue with respect to a classification detection made for the sensed information using a neural network in a specified state.

According to an embodiment the issue related to an inaccuracy of the classification decision. The classification decision is compared to the automated ground truth labeling and when is indicative of a class that differs from the class identified in the automated ground truth labeling-then there may be an issue. An issue may be determined based on one or more additional factors such as whether the error impacted the movement of the vehicle.

According to an embodiment, step 608 includes responsive to the detecting, addressing the detected issue in a driving in the environment of the vehicle by a computer device associated with the vehicle, using a signature generated in association with at least the classification decision or with the detected issue.

According to an embodiment, the neural network is in a same state in the producing of the classification decision, the detecting the issue, and the addressing the detected issue.

According to an embodiment, the signature is generated in association with the classification decision and step 608 includes flagging the signature as being associated with a classification error.

According to an embodiment, step 608 includes determining to ignore the detected issue.

According to an embodiment, step 608 is triggered when the detected issue resulted in an unnecessary movement of the vehicle.

According to an embodiment, method 600 also includes step 610 of generating, by the one or more computing devices, a key performance indicator (KPI) report.

According to an embodiment, method 600 also includes step 612 of analyzing detected issues over a period of time and marking the detected issues for further downstream analysis.

According to an embodiment, the addressing the detected issue involves addressing other detected issues that are classifiably similar (for example—mappable to the same reference cluster) to the detected issue, using the signature. Thus, an object that is similar to an object that triggered a fixing will also benefit from the fixing as it will also be classified correctly following the fixing.

According to an embodiment, the addressing the detected issue involves addressing of other detected issues that are classifiably similar to the detected issue, using the signature.

According to an embodiment, the addressing of the detected issue involves addressing other classification decisions that are classifiably similar to the classification decision, using the signature.

According to an embodiment, the neural network of the classification unit, and another neural network of the one or more computing devices with auto-labeling capabilities are trained with a same training dataset—or with different training datasets.

According to an embodiment, step 608 includes generating the signature for the detected issue using a further neural network that is trained with a same training dataset as the neural network of the classification unit.

Any combination of any step of any method illustrated in the application is provided.

In the foregoing detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarding the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

Any one of transformation module, active learning module, or clustering module, or any other module described herein, may be implemented in hardware and/or code, instructions and/or commands stored in a non-transitory computer readable medium, may be included in a vehicle, outside a vehicle, in a mobile device, in a server, and the like.

The vehicle may be any type of vehicle-such as a ground transportation vehicle, an airborne vehicle, or a water vessel.

The specification and/or drawings may refer to an image. An image is an example of sensed information. Any reference to an image may be applied mutatis mutandis to any type of natural signal such as but not limited to signal generated by nature, signal representing human behavior, signal representing operations related to the stock market, a medical signal, financial series, geodetic signals, geophysical, chemical, molecular, textual, and numerical signals, time series, and the like. Any reference to a media unit may be applied mutatis mutandis to sensed information. The sensed information may be of any kind and may be sensed by any type of sensors-such as a visual light camera, an audio sensor, a sensor that may sense infrared, radar imagery, ultrasound, electro-optics, radiography, LIDAR (light detection and ranging), etc. The sensing may include generating samples (for example, pixel, audio signals) that represent the signal that was transmitted, or otherwise reach the sensor.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

Any reference to an object may be applicable to a pattern. Accordingly-any reference to object detection is applicable mutatis mutandis to a pattern detection.

A situation may be a singular location/combination of properties at a point in time. A scenario is a series of events that follow logically within a causal frame of reference. Any reference to a scenario should be applied mutatis mutandis to a situation.

The sensed information unit may be sensed by one or more sensors of one or more types. The one or more sensors may belong to the same device or system—or may belong to different devices of systems.

We claim:

1. A method for real time management of detected issues, the method comprising:
   producing, by a classification unit having a neural network, a classification decision for sensed information obtained in an environment of a vehicle;
   generating, by one or more computing devices with auto-labeling capabilities, an automated ground truth labeling for the sensed information;
   detecting, by the one or more computing devices and based on a performance indication related to the automated ground truth labeling, an issue with respect to the classification decision; and
   responsive to the detecting, addressing the detected issue in a driving in the environment of the vehicle by a computer device associated with the vehicle, using a signature generated in association with at least the classification decision or with the detected issue;
   wherein the neural network is in a same state in the producing of the classification decision, the detecting the issue, and the addressing the detected issue.

2. The method according to claim 1, wherein the signature is generated in association with the classification decision and the addressing of the detected issue comprise flagging the signature as being associated with a classification error.

3. The method according to claim 1, further comprising determining to ignore the detected issue.

4. The method according to claim 1, comprising addressing the detected issue when the detected issue resulted in an unnecessary movement of the vehicle.

5. The method according to claim 1, further comprising generating, by the one or more computing devices, a key performance indicator (KPI) report.

6. The method according to claim 1, further comprising analyzing detected issues over a period of time and marking the detected issues for further downstream analysis.

7. The method according to claim 1, wherein the addressing the detected issue involves addressing other detected issues that are classifiably similar to the detected issue, using the signature.

8. The method according to claim 1, wherein the addressing the detected issue involves addressing other detected issues that are classifiably similar to the detected issue, using the signature.

9. The method according to claim 1, wherein the addressing of the detected issue involves addressing other classification decisions that are classifiably similar to the classification decision, using the signature.

10. The method according to claim 1, wherein the neural network of the classification unit, another neural network of the one or more computing devices with auto-labeling capabilities are trained with a same training dataset.

11. The method according to claim 1, further comprising generating the signature for the detected issue using a further neural network that is trained with a same training dataset as the neural network of the classification unit.

12. A non-transitory computer readable medium for real time management of detected issues, the non-transitory computer readable medium that stores instructions for:
    producing, by a classification unit having a neural network, a classification decision for sensed information obtained in an environment of a vehicle;
    automatically generating, by one or more computing devices with auto-labeling capabilities, an automated ground truth labeling for the sensed information;
    detecting, by the one or more computing devices and based on a performance indication related to the automated ground truth labeling, an issue with respect to the classification detection; and
    responsive to the detecting, addressing the detected issue in a driving in the environment of the vehicle by a computer device associated with the vehicle, using a signature generated in association with at least the classification decision or with the detected issue;
    wherein the neural network is in a same state in the producing of the classification decision, the detecting the issue, and the addressing the detected issue.

13. The non-transitory computer readable medium according to claim 12, wherein the signature is generated in association with the classification decision and the addressing of the detected issue comprise flagging the signature as being associated with a classification error.

14. The non-transitory computer readable medium according to claim 12, that stores instructions for generating, by the one or more computing devices, a key performance indicator (KPI) report.

15. The non-transitory computer readable medium according to claim 12, that stores instructions for analyzing detected issues over a period of time and marking the detected issues for further downstream analysis.

16. The non-transitory computer readable medium according to claim 12, wherein the addressing the detected issue involves addressing other detected issues that are classifiably similar to the detected issue, using the signature.

17. A method for real time management of detected issues, the method comprising:
automatically generating, by one or more computing devices with auto-labeling capabilities, an automated ground truth labeling for sensed information obtained in an environment of a vehicle;
detecting, by the one or more computing devices and based on a performance indication related to the automated ground truth labeling, an issue with respect to a classification detection made for the sensed information using a neural network in a specified state; and
responsive to the detecting, addressing the detected issue in a driving in the environment of the vehicle by a computer device associated with the vehicle, using a signature generated in association with at least the classification decision or with the detected issue;
wherein the neural network in the specified state in the detecting of the issue.

18. The method according to claim 17, wherein the signature is generated in association with the classification decision and the addressing of the detected issue comprise flagging the signature as being associated with a classification error.

19. The method according to claim 17, further comprising determining to ignore the detected issue.

20. The method according to claim 17, comprising addressing the detected issue when the detected issue resulted in an unnecessary movement of the vehicle.

21. The method according to claim 17, further comprising generating, by the one or more computing devices, a key performance indicator (KPI) report.

22. The method according to claim 17, further comprising analyzing detected issues over a period of time and marking the detected issues for further downstream analysis.

23. A non-transitory computer readable medium for real time management of detected issues, the non-transitory computer readable medium that stores instructions for:
automatically generating, by one or more computing devices with auto-labeling capabilities, an automated ground truth labeling for sensed information obtained in an environment of a vehicle;
detecting, by the one or more computing devices and based on a performance indication related to the automated ground truth labeling, an issue with respect to a classification detection made for the sensed information using a neural network in a specified state; and
responsive to the detecting, addressing the detected issue in a driving in the environment of the vehicle by a computer device associated with the vehicle, using a signature generated in association with at least the classification decision or with the detected issue;
wherein the neural network in the specified state in the detecting of the issue;
wherein the neural network is in a same state in the producing of the classification decision, the detecting the issue, and the addressing the detected issue.

24. The non-transitory computer readable medium according to claim 23, wherein the signature is generated in association with the classification decision and the addressing of the detected issue comprise flagging the signature as being associated with a classification error.

25. The non-transitory computer readable medium according to claim 23, further storing instructions for determining to ignore the detected issue.

26. The non-transitory computer readable medium according to claim 23, further storing instructions for addressing the detected issue when the detected issue resulted in an unnecessary movement of the vehicle.

27. The non-transitory computer readable medium according to claim 23, further storing instructions for generating, by the one or more computing devices, a key performance indicator (KPI) report.

28. The non-transitory computer readable medium according to claim 23, further storing instructions for analyzing detected issues over a period of time and marking the detected issues for further downstream analysis.

* * * * *